(12) United States Patent
Oda et al.

(10) Patent No.: US 7,976,622 B2
(45) Date of Patent: Jul. 12, 2011

(54) WET FLUE GAS DESULFURIZATION APPARATUS

(75) Inventors: Naoki Oda, Hiroshima (JP); Atsushi Katagawa, Hiroshima (JP); Hajime Okura, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 200 days.

(21) Appl. No.: 12/097,814

(22) PCT Filed: Sep. 20, 2006

(86) PCT No.: PCT/JP2006/318601
§ 371 (c)(1),
(2), (4) Date: Jun. 17, 2008

(87) PCT Pub. No.: WO2007/080676
PCT Pub. Date: Jul. 19, 2007

(65) Prior Publication Data
US 2009/0277334 A1    Nov. 12, 2009

(30) Foreign Application Priority Data

Jan. 12, 2006  (JP) ................................. 2006-004621

(51) Int. Cl.
*B01D 47/06* (2006.01)
(52) U.S. Cl. ............... 96/270; 95/235; 96/273; 96/322; 261/117
(58) Field of Classification Search .................. 96/265, 96/270, 273, 322; 95/235; 261/116, 117, 261/188
See application file for complete search history.

(56) References Cited

U.S. PATENT DOCUMENTS

| 4,315,872 | A |   | 2/1982 | Senjo et al. |
|-----------|---|---|--------|--------------|
| 5,494,614 | A | * | 2/1996 | Gohara et al. ................. 261/124 |
| 5,620,144 | A |   | 4/1997 | Strock et al. |

FOREIGN PATENT DOCUMENTS

JP    54-131543    9/1979
(Continued)

OTHER PUBLICATIONS

English language Abstract of JP 59-49823, Mar. 22, 1984.
(Continued)

*Primary Examiner* — Duane Smith
*Assistant Examiner* — Tiffany N Palmer
(74) *Attorney, Agent, or Firm* — Greenblum & Bernstein, P.L.C.

(57) ABSTRACT

Absorption liquid recirculating pipes fitted with absorption tower (absorber) recirculating pumps corresponding to individual spray headers are inserted from the void tower portion inside absorption tower, near the liquid surface of liquid trapping portion (recirculation tank), in the interior of the absorption tower, erected vertically from substantially the center of the absorption tower and connected to respective spray headers provided in multiple stages along the direction of gas flow. Multiple nozzles of each of the spray headers are disposed mutually concentrically or rectangularly on a plane orthogonal to the direction of flue gas flow within the absorption tower. Thus, there can be provided a wet flue gas desulfurization apparatus (system) that is capable of large-capacity flue gas treatment and that in a plant where highly efficient desulfurization of flue gas of high SOx concentration is demanded, even when the amount of liquid circulated through the absorption tower is increased, can avoid increasing of the height of absorption tower and the power of absorption tower recirculating pumps and can realize easily disposing of footpath for maintenance.

11 Claims, 5 Drawing Sheets

FOREIGN PATENT DOCUMENTS

| | | |
|---|---|---|
| JP | 59-49823 | 3/1984 |
| JP | 5-220330 | 8/1993 |
| JP | 6-114233 | 4/1994 |
| JP | 2003-175314 | 6/2003 |

OTHER PUBLICATIONS

English language Abstract of JP 5-220330, Aug. 31, 1993.
English language Abstract of JP 6-114233, Apr. 26, 1994.
English language Abstract of JP 54-131543, Sep. 12, 1979.
English language Abstract of JP 2003-175314, Jun. 24, 2003.

* cited by examiner

PRIOR ART

FIG. 4

PRIOR ART

WET FLUE GAS DESULFURIZATION APPARATUS

TECHNICAL FIELD

The present invention relates to a wet flue gas desulfurization system that reduces sulfur oxide (hereinafter, sometimes referred to as SOx) in a flue gas, soot and dust, and components and substances contained in a boiler fuel by use of an absorbent liquid containing limestone or a slurry including lime.

BACKGROUND ART

Figure 5:
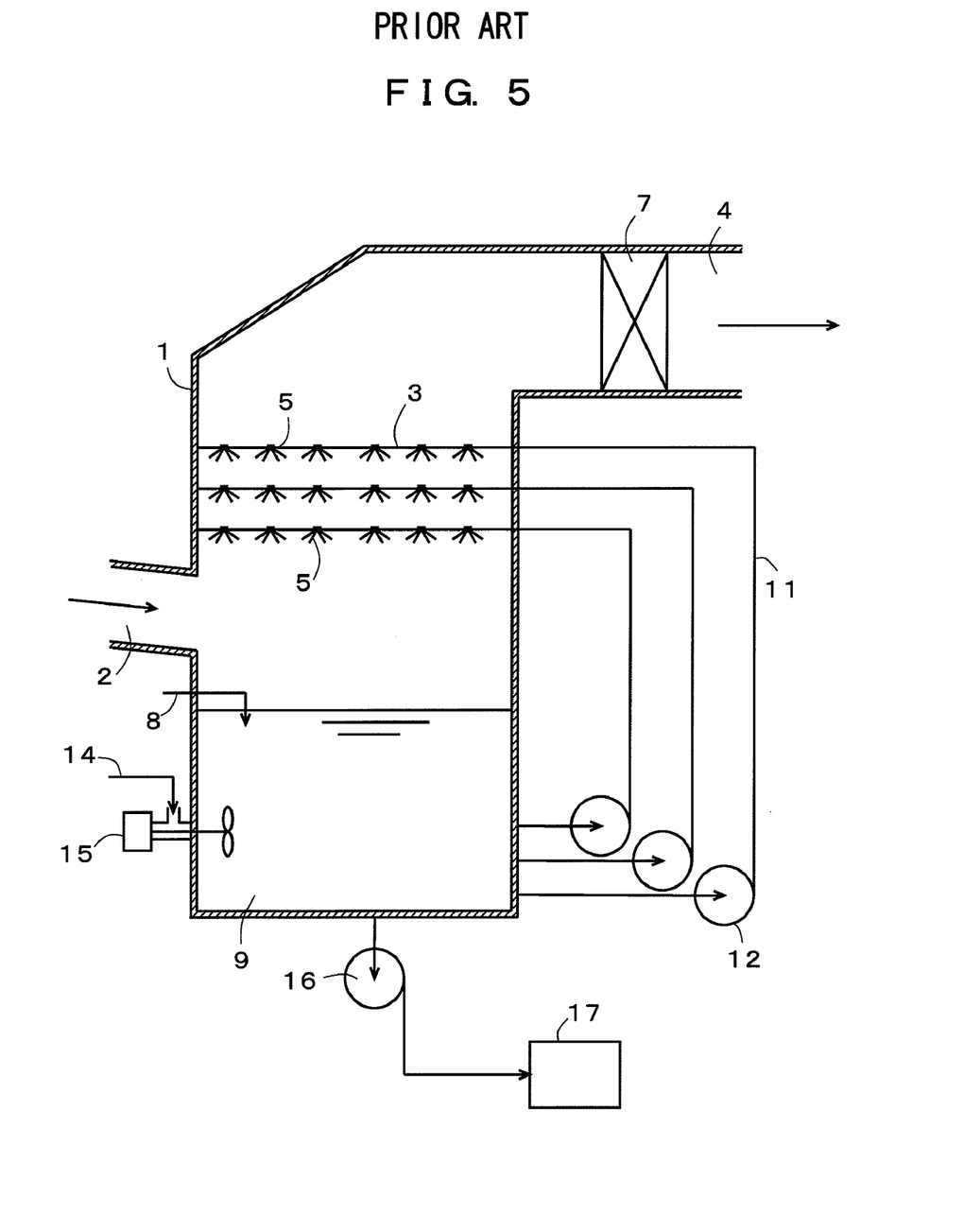
FIG. 5 is a view showing a schematic system around an absorber of a conventional wet flue gas desulfurization system.

For prevention of air pollution, wet limestone-gypsum desulfurization systems have been widely put into practical use as systems that remove sulfur oxide and the like contained in flue gases. This flue gas desulfurization system is shown in FIG. 5. A flue gas emitted from a combustion apparatus such as a boiler is introduced into an absorption tower (absorber) 1 through a gas inlet port 2, and as a result of contact with liquid drops of an absorbent liquid of limestone, a slurry including lime, or the like sprayed from spray nozzles 5 respectively provided on spray headers 3 installed in the absorber 1 and provided in multiple stages along the direction of a flue gas flow, SOx in the flue gas is absorbed along with acid gases such as hydrogen chloride (HCl), hydrogen fluoride (HF), and the like in the flue gas. Simultaneously, soot and dust caused by components contained in the fuel used by the combustion apparatus and other substances are absorbed and removed by the absorbent liquid.

Moreover, mist made to accompany the flue gas is removed by a mist eliminator 7 installed in a gas outlet port 4 of the absorber 1, and a clean gas passes through the gas outlet port 4, is reheated as necessary and discharged from a chimney. An SOx absorbent, for example, limestone, is fed as a limestone slurry 8 into a recirculation tank 9 of the absorber 1 by an unillustrated limestone slurry pump according to the amount of SOx absorption.

The absorbent liquid in the recirculation tank 9 is extracted by a plurality of absorbent liquid recirculation pipes 11 that connect with the recirculation tank 9, raised in pressure by absorber recirculation pumps 12 provided on the recirculation pipes 11, sent to the spray headers 3 connected to the respective recirculation pipes 11, respectively, and then sprayed from the spray nozzles 5. The flue gas that rises inside the absorber makes gas-liquid contact with the sprayed absorbent liquid drops, and SOx and the like in the flue gas are absorbed and removed.

The SOx in the flue gas reacts with calcium in the absorbent liquid to form calcium sulfite (including calcium bisulfite) as an intermediate product, falls in the recirculation tank 9, and is oxidized into gypsum by air 14 fed to the recirculation tank 9 while being raised in pressure by an unillustrated air blower or the like to be an end product (gypsum). By thus directly feeding air into the absorber 1, an absorption reaction of SOx in the flue gas and an oxidation reaction of the produced calcium sulfite are made to progress simultaneously, whereby a desulfurization reaction as a whole can be promoted.

Also, the air 14 to be fed to the recirculation tank 9 for an oxidation reaction of calcium sulfite is miniaturized by an oxidizing agitator 15 to thereby increase the utilization rate of oxidization air. Thereafter, the absorbent liquid slurry is extracted from the recirculation tank 9 while being raised in pressure by a gypsum slurry bleedpump 16 according to the amount of produced gypsum, sent to gypsum dewatering system 17, and collected as powder gypsum.

In recent years, there have been an increasing number of cases where a large capacity of flue gas from a large-capacity boiler or a plurality of boilers is treated by one absorber for improvement in reliability of a wet flue gas desulfurization system and from an economic perspective. Moreover, when the concentration of SOx in a flue gas is high or when highly efficient desulfurization of a large capacity of flue gas or a flue gas with a high SOx concentration is required, the necessary desulfurization performance is satisfied by increasing the amount of circulation spray of the absorber.

The amount of liquid circulated through the absorber is increased particularly in a plant where highly efficient desulfurization of a large capacity of flue gas with a high SOx concentration is required. On the other hand, since there are limits in the capacity of absorbent liquid to be sprayed by the spray nozzles 5 attached to the absorber spray header 3, the installing number of spray nozzles 5 to be attached to each absorber spray header 3, and liquid feeding amount performance of the absorber recirculation pump 12, respectively, there is a limit to the amount of absorbent liquid to be circulatively fed to the spray nozzles 5 of each spray header 3, so that multiple stages of spray headers 3 are installed.

When there are three stages of spray headers 3 as shown in FIG. 5, due to a restriction in the capacity of the absorber recirculation pump 12, it is necessary to install one or, possibly, a plurality of absorber recirculation pumps 12 per one stage of spray header 3. Since the amount of liquid circulation is increased in the above-described flue gas desulfurization system that is capable of treating a large capacity of flue gas and that highly efficiently desulfurizes a flue gas with a high SOx concentration, it is necessary to provide a larger number of stages of spray headers 3 and a larger number of absorber recirculation pumps 12 than those conventionally provided.

Contrivances of an absorber to meet such a demand have been disclosed in Specification of U.S. Pat. No. 5,620,144 and Japanese Published Unexamined Patent Application No. 2003-175314.

DISCLOSURE OF THE INVENTION

Problems to be Solved by the Invention

In the above-described absorber shown in FIG. 5, it is effective to reduce the number of spray header stages for a reduction in the cost of equipment, however, in this case, it is necessary to form the spray headers 3 with a large caliber because of an increase in the liquid amount. In a conventional art, when two recirculation pumps 12 are installed for an identical absorbent liquid circulation path, simply considered is a configuration, as shown in a view of the inside of an absorber observed from one horizontal section, arranged with spray headers, of a vertical absorber in FIG. 4, to insert multiple spray headers 3 into a plane orthogonal to the direction of a flue gas flow within the absorber from two opposite wall surfaces of the absorber into the absorber and spray an absorbent liquid from spray nozzles 5 of each spray header 3. The invention described in U.S. Pat. No. 5,620,144 resembles the configuration shown in FIG. 4.

Figure 4:
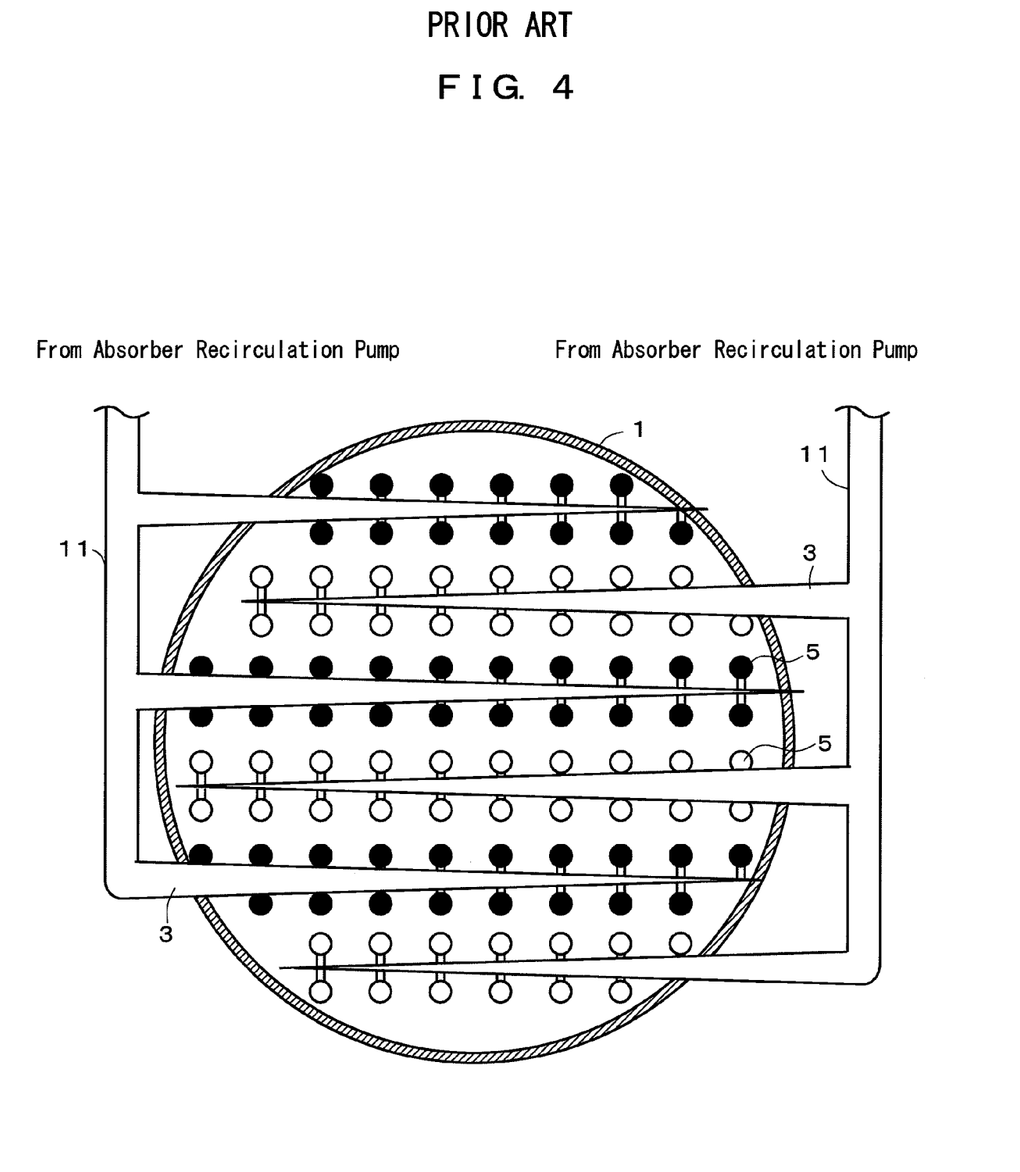
FIG. 4 is a view showing an arrangement of spray nozzles of a wet flue gas desulfurization system that treats a flue gas with a high SOx concentration of the present invention.

However, even in the configuration shown in FIG. 4, for feeding a sufficient absorbent liquid from an outlet of the absorber recirculation pump (not shown) via an absorbent liquid recirculation pipe 11 to each spray header 3 whose longitudinal direction is oriented in the horizontal direction, it is necessary to form the spray header 3 normally with a caliber of 1 m or more. Accordingly, when multiple stages of spray headers 3 are installed in the height direction of the vertical absorber 1, the height of a spray header installing section is relatively high to appropriately secure a gap between two adjacent spray headers 3 and 3, this also makes the height of the absorber 1 as a whole high, so that the cost of the absorber 1 is increased. Moreover, when the height of installation of the multiple stages of spray headers 3 is high, the head of the absorber recirculation pump 12 is increased, and power consumption of the pump 12 becomes larger than conventional power consumption. Further, when the spray headers 3 with a large caliper are installed in the periphery of the absorber 1, a problem also occurs that it becomes difficult to arrange walkway for maintenance.

Moreover, the invention described in Japanese Published Unexamined Patent Application No. 2003-175314 discloses a configuration, for improving the efficiency of flue gas desulfurization, to make a flue gas flow while circumventing by a partition plate which is erected vertically in a vertical absorber and whose lower end portion is immersed in a recirculation tank, and multiple stages of spray nozzles extending in the horizontal direction are installed in the partition plate. However, this invention is of a configuration where the spray nozzles of each stage penetrate through a sidewall of the vertical absorber, which is the same in the basic configuration as the absorber shown in FIG. 5, and thus the height of a spray header installing section is relatively high, and this also makes the height of the absorber as a whole relatively high.

It is an object of the present invention to provide a wet flue gas desulfurization system that is capable of treating a large capacity of flue gas and that, in a plant where highly efficient desulfurization of a flue gas with a high SOx concentration is required, even when the amount of liquid circulated through an absorber is increased, can avoid increasing the height of the absorber and the power of absorber recirculation pumps and allows easily arranging walkway for maintenance.

Means for Solving the Problems

The abovementioned object can be achieved by the following solution means.

A first aspect of the invention provides a wet flue gas desulfurization system including: an absorber in which a flue gas emitted from a combustion apparatus is introduced, and an absorbent liquid containing limestone or a slurry including lime is sprayed into the flue gas from spray nozzles of spray headers provided in multiple stages along a direction of a flue gas flow to absorb and remove soot and dust contained in the flue gas, a sulfur oxide, and substances caused by components included in a fuel used in the combustion apparatus; an absorbent recirculation tank provided in a lower portion of the absorber; and a plurality of absorbent liquid circulation paths that circulatively feed the absorbent liquid extracted out of the absorber from the absorbent recirculation tank again to the respective spray headers, respectively, wherein each circulation path is inserted, for each individual spray header, from a wall surface of a void tower portion near the absorbent recirculation tank, inside the absorber, a longitudinal direction thereof is arranged from a center of the absorber or a vicinity thereof in a direction along a flue gas flow, and a front-end portion thereof is connected to the spray header.

A second aspect of the invention provides the wet flue gas desulfurization system according to the first aspect, wherein multiple spray nozzles of each spray header are arranged so as to mutually form concentric circles on a plane orthogonal to the direction of a flue gas flow in the absorber.

A third aspect of the invention provides the wet flue gas desulfurization system according to the first aspect, wherein multiple spray nozzles of each spray header are arranged so as to mutually form rectilinear shapes on a plane orthogonal to the direction of a flue gas flow in the absorber.

According to the first to third aspects of the present invention, the height of the spray headers in the absorber never becomes higher than the conventional height even when the amount of flue gas to be treated is increased, an increase in driving force of an absorbent liquid circulation flow in the absorbent liquid circulation path can also be prevented, and furthermore, walkway for maintenance can be easily arranged in the periphery of the spray nozzles.

BEST MODE FOR CARRYING OUT THE INVENTION

Figure 3:
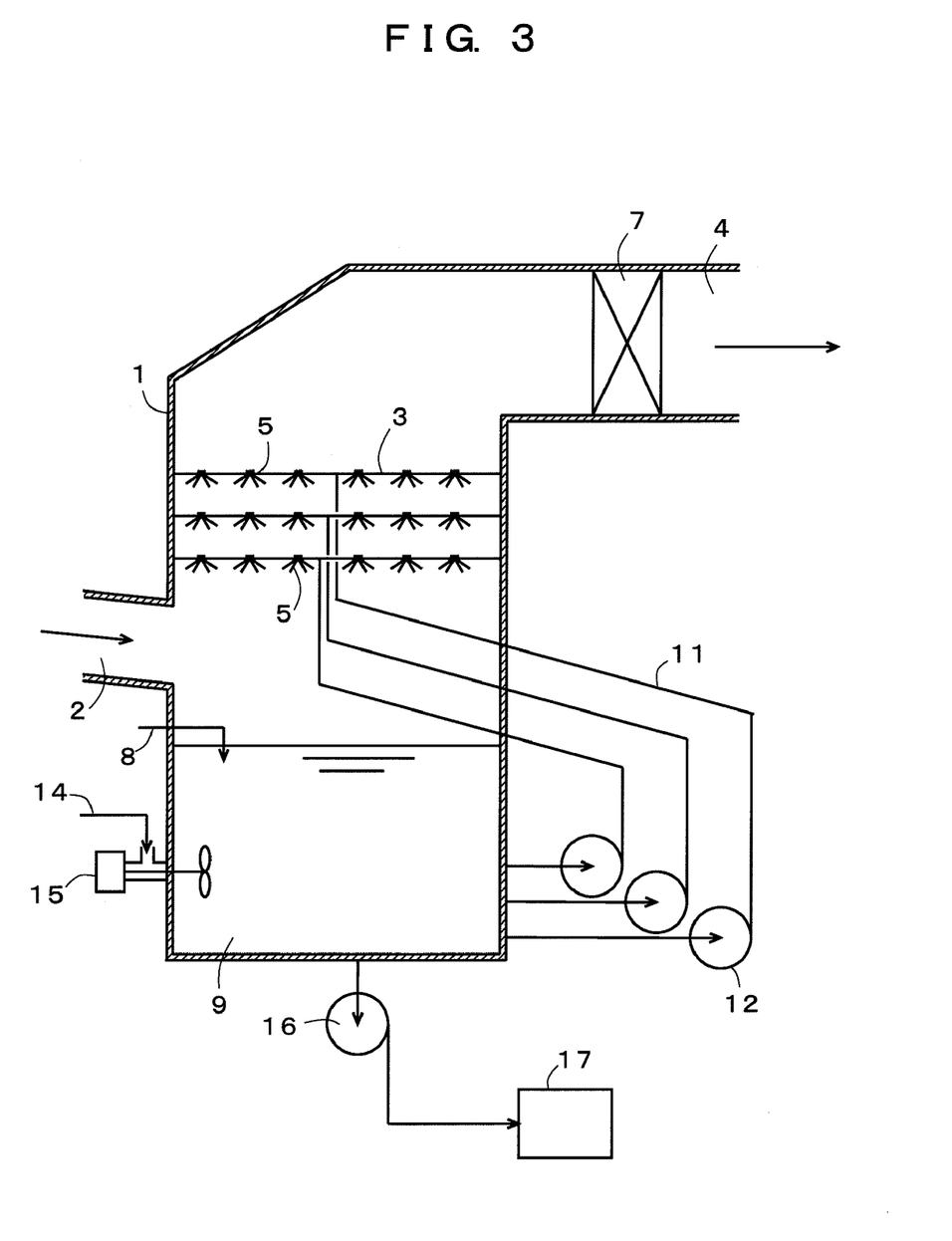
FIG. 3 is a view showing a system around an absorber of a wet flue gas desulfurization system that treats a flue gas with a high SOx concentration of the present invention.

A schematic system of a wet flue gas desulfurization system according to an example of the present invention is shown in FIG. 3.

The flue gas desulfurization system shown in FIG. 3 is different from the conventional flue gas desulfurization system shown in FIG. 5 in that each absorbent liquid recirculation pipe 11 erected from an outlet of a vertical absorber recirculation pump 12 is inserted, from a void tower portion lower than a gas inlet port 2 of an absorber 1 and near the liquid surface of a recirculation tank 9, inside the absorber 1, and then erected up to a spray header 3 attached with spray nozzles 5.

In the absorber 1 shown in FIG. 3, the respective absorbent liquid recirculation pipes 11 fitted with the respective absorber recirculation pumps 12 corresponding to the respective spray headers 3 provided in multiple stages along the direction of a flue gas flow are inserted inside the absorber through a wall surface of the absorber 1, erected vertically from the center of the absorber 1 near the liquid surface of the recirculation tank 9, and connected to the spray headers 3. It is preferable that the absorbent liquid recirculation pipe 11 inserted inside the absorber 1 through a wall surface thereof and reaching substantially the center of the absorber 1 is formed of an inclined pipe and a part to be connected to the spray header 3 from substantially the center of the absorber 1 is vertically erected.

As a result of providing an inclined portion in the pipe 11, an absorbent liquid slurry in the spray header 3 quickly flows down into the recirculation tank 9 when operation of the absorber recirculation pump 12 is stopped. When operation of the absorber recirculation pump 12 is stopped, if the flow of absorbent liquid slurry becomes stagnant inside the spray header 3, solids in the absorbent liquid slurry may settle inside the spray header 3 and the absorbent liquid recirculation pipe 11 to thereby clog the spray header 3 and the pipe 11, however, such a situation can be prevented if an inclined portion exists in the pipe 11.

Moreover, with regard to supports of the spray header 3 and the absorbent liquid recirculation pipe 11 at the center of the absorber 1, exclusive supports of the spray header 3 and the absorbent liquid recirculation pipe 11 at the center of the absorber 1 may be provided inside the absorber 1, however, in order to prevent scaling and the like wherever possible, it is preferable to reduce the number of internal components. Therefore, it is also possible to provide a support of the spray header 3 by fixing an end portion of the spray header 3 to an inner wall surface of the absorber 1 by welding or the like.

Figure 1:
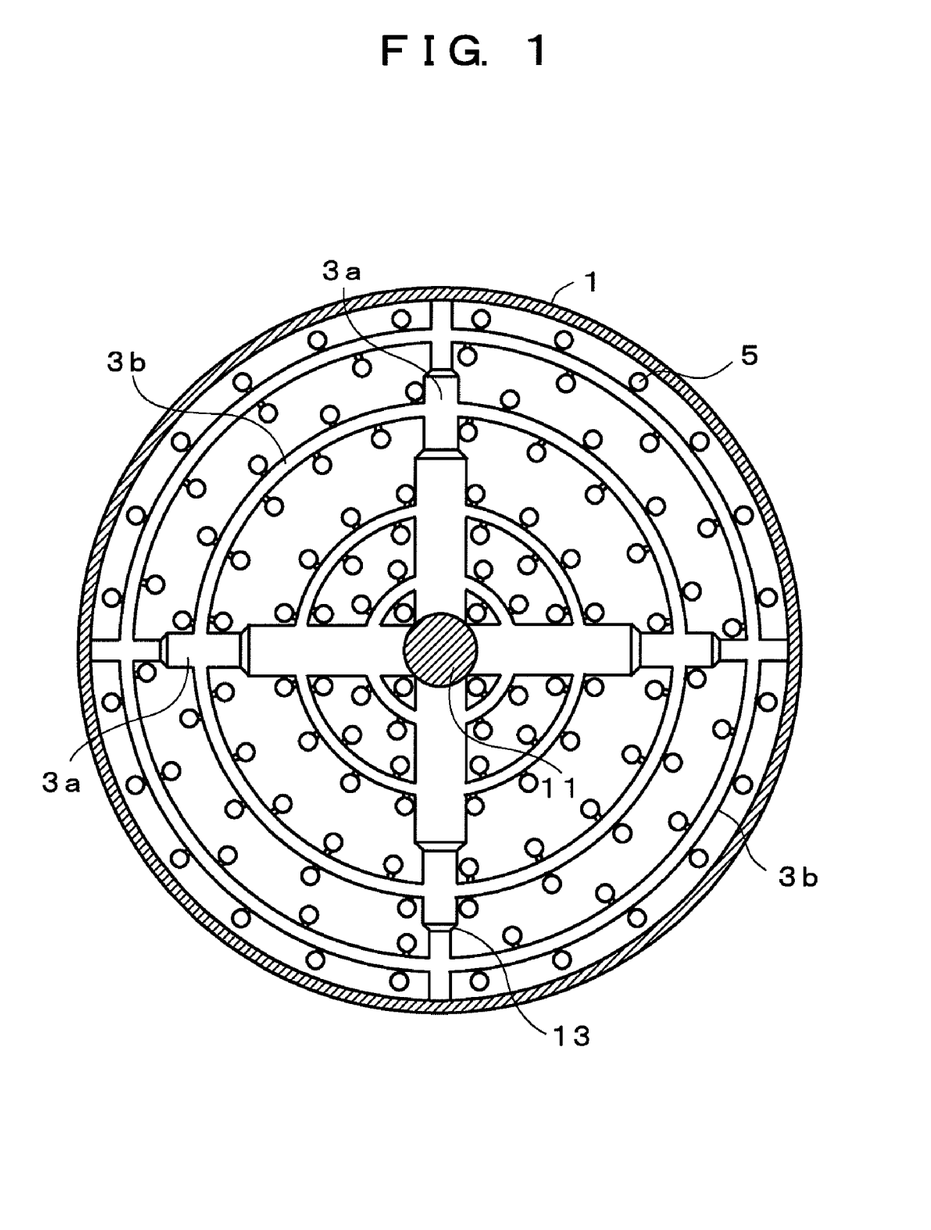
FIG. 1 is a view showing an arrangement of spray headers and spray nozzles of a wet flue gas desulfurization system that treats a flue gas with a high SOx concentration of the present invention, wherein the spray nozzles are arranged so as to form concentric circles.

Although an arrangement of the spray nozzles 5 of each spray header 3 of the present example is shown in FIG. 1, the example of the present invention is not limited thereto.

The absorbent liquid recirculation pipe 11 extended vertically upward from the center of the absorber 1 connects with a spray header 3a arranged in the horizontal direction. The spray header 3a shown in FIG. 1 has a cross shape in a plan view, and the cross-shaped spray header 3a is connected with multiple spray headers 3b with circular shapes that are concentric circles having planes in the horizontal direction centered on the absorbent liquid recirculation pipe 11 located at the center of the absorber 1. By installing a large number of spray nozzles 5 in the circular-shaped spray header 3b, multiple spray nozzles 5 are installed on the horizontal concentric circles in the absorber 1.

For satisfying desulfurization performance of flue gas, it is not allowed to have a difference in the amount of the absorbent liquid to be sprayed from the respective spray nozzles 5, so that it is necessary to set the spray liquid amounts of the respective spray nozzles 5 almost the same. An absorbent liquid slurry flow in the cross-shaped spray 3a is large in the vicinity of the absorbent liquid recirculation pipe 11 at the center of the absorber 1 and is reduced as it becomes closer to the wall surface of the absorber 1. By the relationship of the quantity of spray nozzles 5, when the pipe diameter throughout the spray header 3b is the same, the flow velocity of the absorbent liquid slurry inside the spray header 3b is great in the vicinity of the absorbent liquid recirculation pipe 11 at the center of the absorber 1, while the absorbent liquid slurry flow velocity in the vicinity of the wall surface of the absorber 1 is small. Therefore, an imbalance occurs that the spray liquid amount of the spray nozzle 5 in the vicinity of the absorbent liquid recirculation pipe 11 at the center of the absorber 1 is large and the spray liquid amount in the vicinity of the wall surface is small, and this is not preferable to satisfy the desulfurization performance.

For avoiding the imbalance in the spray liquid amount, the spray header 3a is changed in pipe diameter depending on the site of installation thereof in the present example so that the internal flow velocity of the cross-shaped spray header 3a can be maintained almost constant at all sites of the header 3a.

More specifically, the pipe diameter of the cross-shaped spray header 3a in the vicinity of the absorbent liquid recirculation pipe 11 at the center of the absorber 1 is large, and as it becomes closer to the wall surface of the absorber 1, the pipe diameter of the spray header 3a is gradually reduced so that the flow velocity in the pipe 11 is maintained constant. In FIG. 1, shown as a concrete example thereof is an example where a reducer 13 was provided at an appropriate site of the cross-shaped spray header 3a to reduce the pipe diameter in stages. Alternatively, the pipe diameter of the spray header 3a may be gradually and successively reduced as it becomes closer to the wall surface from the center of the absorber 1.

Figure 2:
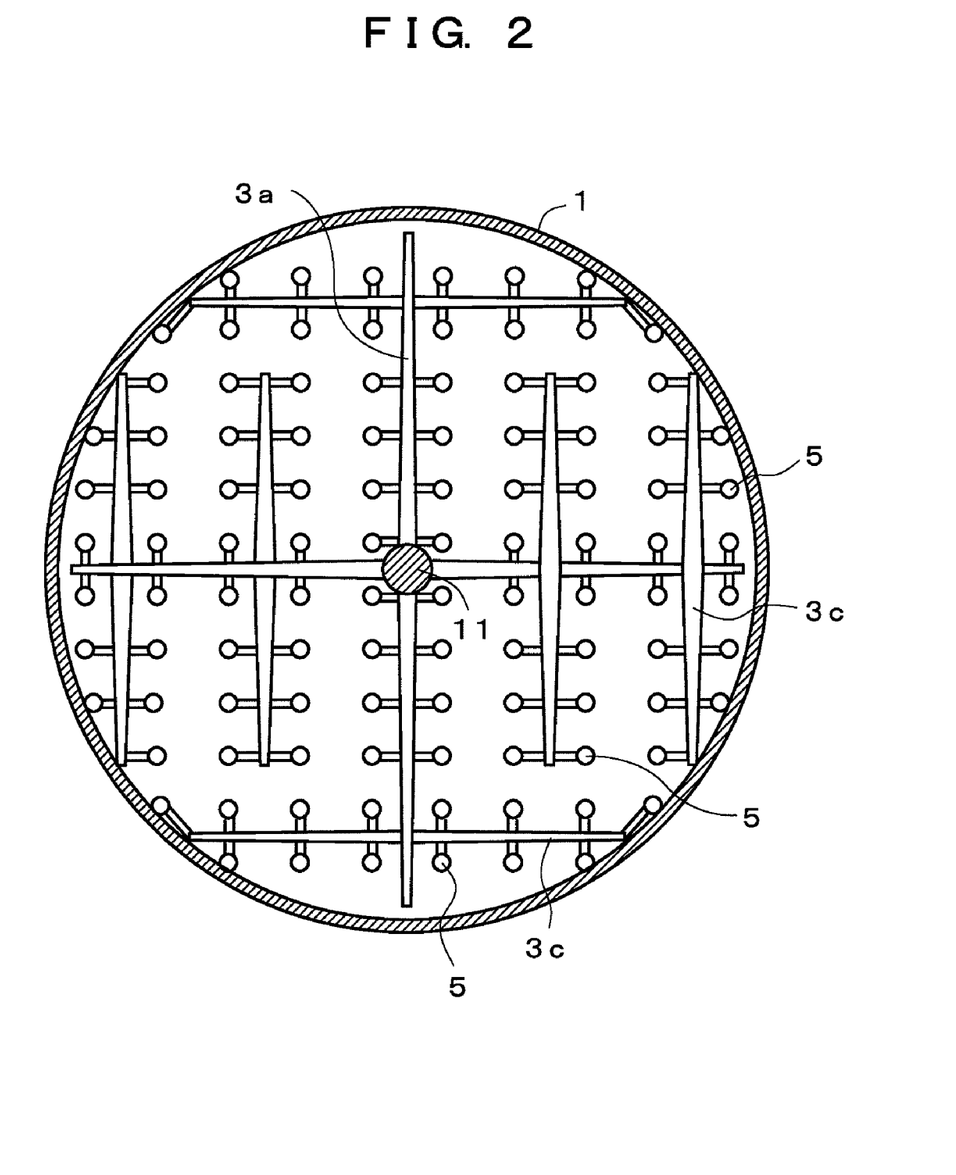
FIG. 2 is a view showing an arrangement of spray headers and spray nozzles of a wet flue gas desulfurization system that treats a flue gas with a high SOx concentration of the present invention, wherein the spray nozzles are arranged in rectilinear shapes.

Moreover, by connecting a cross-shaped spray header 3a that spreads in the horizontal direction to an absorbent liquid recirculation pipe 11 arranged vertically at the center of the vertical absorber 1 and connecting multiple rectilinear spray headers 3c orthogonal to the longitudinal direction of the header 3a and extending in the horizontal direction as shown in FIG. 2, the spray nozzles 5 may be rectangularly arranged within a horizontal plane of the absorber 1. In FIG. 2, shown is an example where the pipe diameter of the cross-shaped spray header 3a is successively reduced as it becomes closer to the wall surface of the absorber 1 from the absorbent liquid recirculation pipe 11 at the center of the absorber 1, however, a reducer 13 may be used as shown in FIG. 1 so that the pipe diameter is reduced in stages.

INDUSTRIAL APPLICABILITY

The present invention is useful for a plant that is capable of treating a large capacity of flue gas and where highly efficient desulfurization of a flue gas with a high SOx concentration is demanded.

What is claimed is:

1. A wet flue gas desulfurization system comprising:
an absorber in which flue gas emitted from a combustion apparatus is introduced, and an absorbent liquid is sprayed into the flue gas from spray nozzles of spray headers provided in multiple stages along a direction of a flue gas flow to absorb and remove soot and dust contained in the flue gas, sulfur oxide, and substances caused by components included in a fuel used in the combustion apparatus; an absorbent recirculation tank provided in a lower portion of the absorber; and a plurality of absorbent liquid circulation paths that circulatively feed the absorbent liquid extracted out of the absorber from the absorbent recirculation tank again to the respective spray headers, respectively, wherein
each circulation path comprises an absorber recirculation pump for each individual spray header, each absorber recirculation pump being provided externally of the absorber, the circulation path for each individual spray header extends through a wall surface of a void tower portion near the absorbent recirculation tank, and inside the absorber by way of an upwardly inclined pipe that extends in a longitudinal direction of the absorber, the circulation path further extending in a direction of flue gas flow at a center or in a vicinity of the center of the absorber, and a front-end portion of each of the circulation paths is connected to the respective individual spray header.

2. The wet flue gas desulfurization system according to claim 1, wherein multiple spray nozzles of each spray header are arranged so as to mutually form concentric circles on a plane orthogonal to the direction of a flue gas flow in the absorber.

3. The wet flue gas desulfurization system according to claim 1, wherein multiple spray nozzles of each spray header are arranged so as to mutually form rectilinear shapes on a plane orthogonal to the direction of a flue gas flow in the absorber.

4. The wet flue gas desulfurization system according to claim 1, each circulation path further comprising an upwardly inclined pipe that is positioned within the absorber.

5. The wet flue gas desulfurization system according to claim 1, each circulation path further comprising an upwardly inclined pipe that is positioned outside of the absorber.

6. The wet flue gas desulfurization system according to claim 1, each spray header having a cross-section that decreases, in discrete steps, as a distance from a center of the absorber increases.

7. The wet flue gas desulfuration system according to claim 1, said absorbent liquid containing limestone or a slurry including lime.

8. A wet flue gas desulfurization system comprising:
an absorber in which flue gas emitted from a combustion apparatus is introduced, and an absorbent liquid is sprayed into the flue gas from spray nozzles of spray headers provided in multiple stages along a direction of flue gas flow to absorb and remove soot and dust contained in the flue gas, sulfur oxide, and substances caused by components included in a fuel used in the combustion apparatus;
an absorbent recirculation tank provided in a lower portion of the absorber;
a plurality of absorbent liquid circulation paths that feed the absorbent liquid extracted out of the absorber from the absorbent recirculation tank to the respective spray headers, wherein
each circulation path comprises an absorber recirculation pump for each individual spray header, the absorber recirculation pump being provided externally of the absorber, the circulation path for each individual spray header is defined by conduits that extend, for each individual spray header, from the absorber recirculation pump, into the absorber by an upwardly inclined conduit portion that extends through a wall of the tank and through a further conduit that extends, in a longitudinal direction of the absorber, each further conduit being positioned in a vicinity of a center of the absorber, and extends in a direction of flue gas flow, and a front-end portion of each longitudinal circulation path portion is connected to a respective spray header.

9. The web flue gas desulfurization system according to claim 8, each further conduit extending substantially vertically from the upwardly inclined conduit to the respective spray header.

10. The wet flue gas desulfuration system according to claim 8, said absorbent liquid containing limestone or a slurry including lime.

11. The wet flue gas desulfuration system according to claim 1, further comprising a substantially vertical pipe that extends, in the direction of flue gas flow, between the upwardly inclined pipe and the respective spray header.

\* \* \* \* \*